United States Patent [19]

Hamilton

[11] Patent Number: 5,214,896

[45] Date of Patent: Jun. 1, 1993

[54] USED TIRE CONSTRUCTION BLOCK

[75] Inventor: Robert W. Hamilton, Tacoma, Wash.

[73] Assignee: The United States of America as represented by the Secretary of the Army, Washington, D.C.

[21] Appl. No.: 908,142

[22] Filed: Jul. 2, 1992

[51] Int. Cl.$^5$ .............................................. E04B 1/02
[52] U.S. Cl. ................................. 52/563; 52/DIG. 9
[58] Field of Search ........................... 52/DIG. 9, 563

[56] References Cited

U.S. PATENT DOCUMENTS

| | | | |
|---|---|---|---|
| 3,934,540 | 1/1976 | Bruner et al. | 52/DIG. 9 |
| 3,949,527 | 4/1976 | Double et al. | 52/DIG. 9 |
| 3,951,384 | 4/1976 | Hildreth, Jr. | 52/DIG. 9 |
| 4,022,434 | 5/1977 | Moore | 52/DIG. 9 |
| 4,188,153 | 2/1980 | Taylor | 52/DIG. 9 |
| 5,056,961 | 10/1991 | McMeans et al. | 52/DIG. 9 |
| 5,103,616 | 4/1992 | Nordberg | 52/DIG. 9 |

FOREIGN PATENT DOCUMENTS 0142732 7/1980 German Democratic Rep. ............. 52/DIG. 9

*Primary Examiner*—Carl D. Friedman
*Assistant Examiner*—Joanne C. Downs
*Attorney, Agent, or Firm*—Luther A. Marsh

[57] ABSTRACT

A construction block for use in building a variety of structures such as underwater reefs, bulkheads, bridge piers, highway dividers, highway and aircraft landing field subsurfaces, and the like is characterized by a used tire having a quantity of concrete filling the interior of the tire. The block includes at least one first connector member retained within the concrete and having an end which extends through the tread portion of the tire. A second connector is retained within the concrete perpendicular to the first connector, and has an end extending from a central opening in one of the sidewalls. A structural assembly is formed from a plurality of the blocks arranged and connected to define a structure having at least one layer of blocks. Preferably the first connectors include bent portions, and rings are provided for connecting the bent portions of adjacent blocks together. The structure may include a plurality of stacked layers, and the rings may be used to connect the second connector members between adjacent layers. A tool for bending the first connectors is also disclosed.

10 Claims, 5 Drawing Sheets

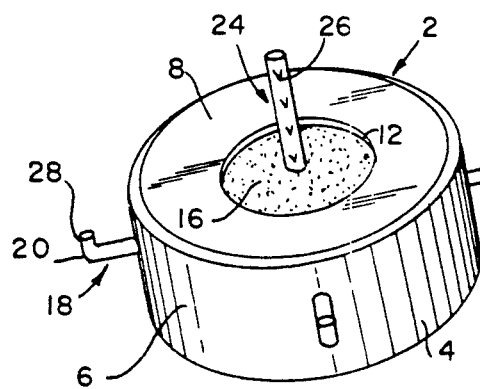
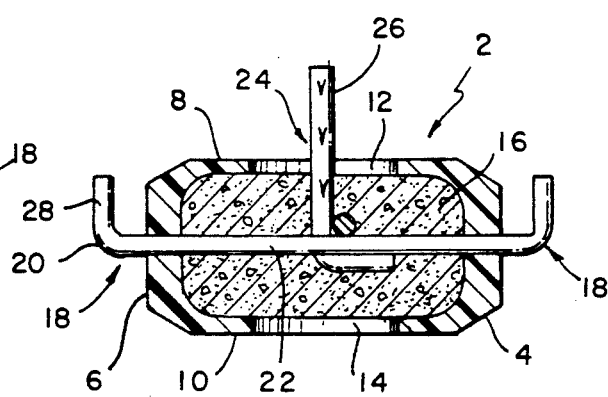
FIG. 1      FIG. 2
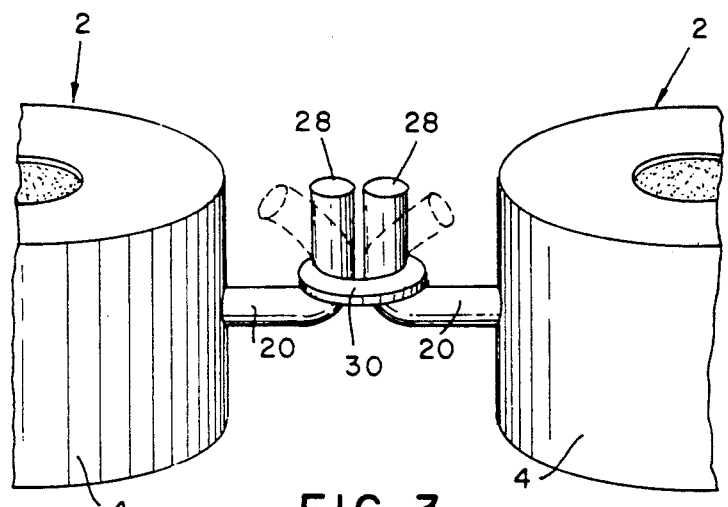
FIG. 3
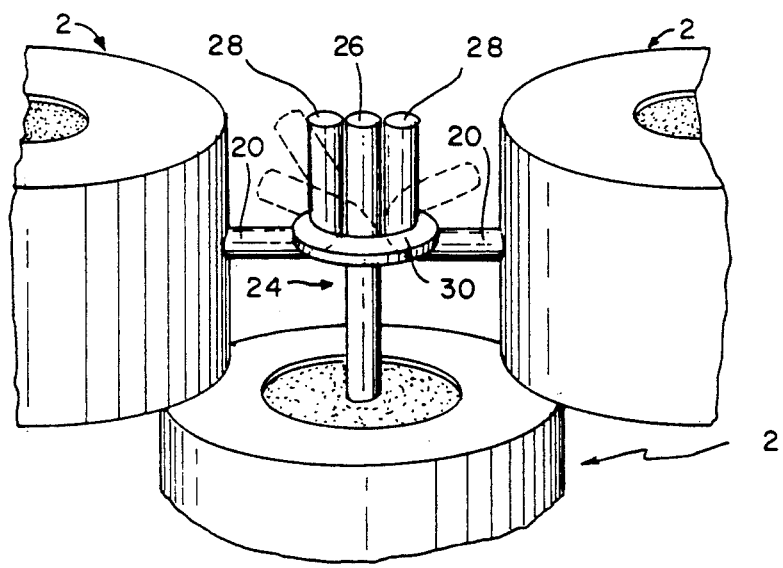
FIG. 4

USED TIRE CONSTRUCTION BLOCK

BACKGROUND OF THE INVENTION

The present invention relates to the use of used tires in building structures. More particularly, the invention relates to a construction block comprising a used tire and to various structures built by arranging and interconnecting a plurality of such blocks. An inventive method for transporting large numbers of tires to a remote location by water is also disclosed.

The disposal of used tires has become a major ecological problem. Currently, huge stockpiles of used tires are collecting in used tire dumps. The number, size, fire danger, and adverse health factors of used tire dumps, and the ecology of solid waste land fills have become such severe problems that local and state governments now compensate anyone who will use the tires in an ecologically approved application. Tires are made to be extremely durable, and they retain their durability long after their useful life on vehicles. Recycling used tires has not proven to be an acceptable alternative due to the expense, the large amount of energy required, and the resulting undesirable byproducts.

Therefore, a need has been created for an ecologically acceptable use for used tires. The present invention meets this need by providing a desirable use for used tires which takes full advantage of the tires durability and other useful features. In accordance with the invention, a construction block is formed from a used tire which can be used as an inexpensive alternative to conventional construction blocks in building a variety of structures.

The construction blocks of the invention can be used in various construction applications such as underwater reefs, sea water bulkheads, docks, dikes, canal sidewalls, lock walls and bottoms, energy absorbing highway dividers and barricades, highway guard rails and rock slide catchers, abutments, bridge piers, foundation footings, erosion control nets/blankets, highway and aircraft landing field subsurfaces, containment bulkheads, blast resistant structures, and the like.

Many of the potential uses for the construction block of the present invention are in water related construction projects located great distances from a used tire source. Therefore, in accordance with the invention, a method for economically transporting large quantities of tires to remote locations by water is disclosed.

SUMMARY OF THE INVENTION

Accordingly, it is a primary object of the present invention to provide an inexpensive construction block for use in building a variety of structures. The construction block includes a tire having a tread portion and two opposed sidewalls defining an interior chamber, each of the sidewalls having a central opening therein. A quantity of hardened material, such as concrete, is provided which substantially fills the interior chamber of the tire. The block includes at least one first connector member retained within the hardened material and having an end which extends through the tread portion of the tire. A second connector member is retained within the material perpendicular to the first connector member and having an end extending from the central opening in one of the sidewalls.

Another object of the invention is to provide a structural assembly including a plurality of construction blocks arranged and connected together. Means are provided for connecting adjacent first connectors to define a horizontal structure having at least one layer of blocks. Preferably, the first connectors include a bent portion, and the connector means comprises rings which receive the bent portions.

According to a more specific embodiment of the invention, the structural assembly includes a plurality of layers of blocks arranged in vertical stacked relation, and the rings connect the second connectors between adjacent layers.

A further object of the invention is to provide a rockslide catching apparatus which includes a layer of plastic sheet material, a layer of tires positioned in tread-to-tread relation, and a flexible line woven through the sheet and the tires for interconnection therewith.

Yet another object of the invention is to provide a method of transporting a large number of tires to a remote location. In accordance with the method, a plurality of tires are interconnected to define a net which is positioned in a dry dock. A plurality of tires are loaded in the net, and a tow line is connected therewith. The dry dock is then flooded to cause the net and contained tires to float relative to the bottom of the dry dock. The net is then towed by a boat to a remote location, and the tires are unloaded for use in building a structure.

BRIEF DESCRIPTION OF THE FIGURES:

Other objects and advantages of the subject invention will become apparent from a study of the following specification when viewed in the light of the accompanying drawing, in which:

FIG. 1 is a perspective view of the construction block of the present invention.

FIG. 2 is a sectional side view of the construction block of FIG. 1;

FIG. 3 is a partial perspective view of a pair of construction blocks having their first connectors connected with a ring;

FIG. 4 is a partial perspective view of three construction blocks interconnected in a stacked relation;

DETAILED DESCRIPTION

Figure 6A:
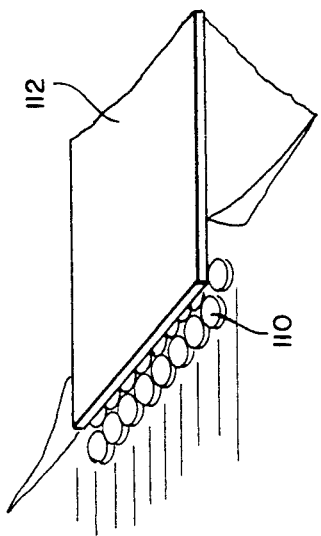
FIGS. 6a through 6g are partial views of various structures built using the construction block of the present invention.

As shown in FIGS. 1 and 2, the construction block 2 of the present invention includes a tire 4 having a tread portion 6 and two opposed sidewalls 8 and 10. Any size tire 4 can be used in building the construction block 2 of the present invention. Preferably, the time 4 is a used tire which is no longer useful on a vehicle due to tread wear or the like. The sidewalls 8 and 10 each have a central opening 12 and 14 therein. A quantity of hardened material 16 substantially fills the interior of the tire 4. Preferably, the hardened material 16 is concrete, but any other suitable material which can be poured into the tire 4 and hardened can be used.

A plurality of first connector members 18 are retained within the concrete 16 and have ends 20 which extend radially through the tread portion 6 of the tire 4. Preferably, the plurality of first connectors 18 comprise opposed pairs of connectors, wherein each opposed pair includes a unitary elongated bar 22. Each of the first connector members 18 include bent portions 28 for facilitating connection with other blocks. A second connector member 24 is retained within the concrete 16 perpendicular to the first connector members 18, and has an end 26 extending through the opening 14 in the sidewall 8. Preferably, the first and second connection members 18 and 24 are iron bars of the type used in reinforcing concrete structures or the like, commonly known as "rebar".

By providing a construction block 2 as hereinbefore described, the block 2 can be positioned to rest on the sidewall 10 such that the first connector member 18 extends horizontally and the second connector member 24 extends vertically. In this position, a plurality of construction blocks 2 can be arranged and connected together to define a horizontal structure having at least one layer of blocks 2.

As shown in FIG. 3, the horizontal connector ends 20 of adjacent blocks 2 can be connected together through the use of a connecting ring 30 which receives the bent portions 28 of the connector ends 20. The bent portions 28 can be bent around the ring 30 to securely connect the adjacent blocks together.

As shown in FIG. 4, the blocks 2 can be arranged to define a structure having a plurality of layers of blocks 2 in a vertical stacked relation. In addition to connecting adjacent horizontal connector ends 20, the ring can be used to connect the vertical connector 24 between adjacent layers. The vertical connector end 26 can be bent around the ring 30 to maintain a secure connection therewith.

The blocks 2 can be arranged and/or stacked in any suitable configuration depending on the structural properties desired. A structure can be built with a single layer of blocks, wherein the layer includes a single row, or a plurality of parallel rows of blocks. The rows of blocks within a layer may be offset from one another to define a dense structure. Alternatively, a structure can be built having a plurality of layers of blocks, wherein each of the layers includes a single or a plurality of rows of blocks. When a plurality of layers are used, the blocks in adjacent layers are preferably offset from one another such that each block in a stacked layer is supported in contiguous relation by a plurality of blocks in the layer below.

The construction block 2 of the present invention is extremely durable and will last for hundreds of years on land or underwater without losing its structural integrity. In addition, structures built with the construction block 2 provide tremendous force and impact resistance, because each individual block 2 can move substantially upon impact without significantly affecting the remainder of the structure.

Figure 5:
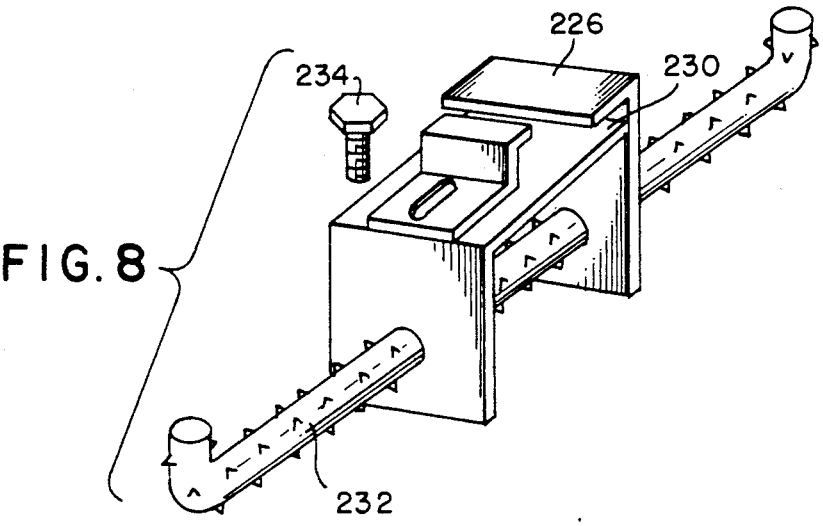
FIG. 5 is a perspective view of a plurality of blocks arranged and connected together to define a structure.

In FIG. 5, there is shown a structure having a plurality of layers of blocks 2, wherein each layer includes a plurality of parallel rows of blocks. This configuration is useful, for example, in constructing an underwater reef or the like.

Figure 6C:
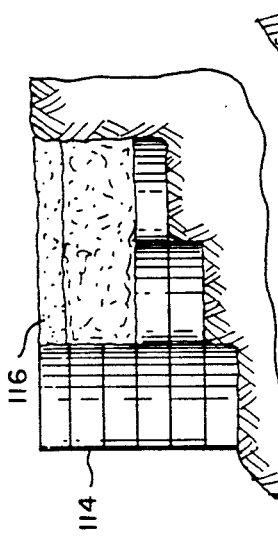
Figure 6B:
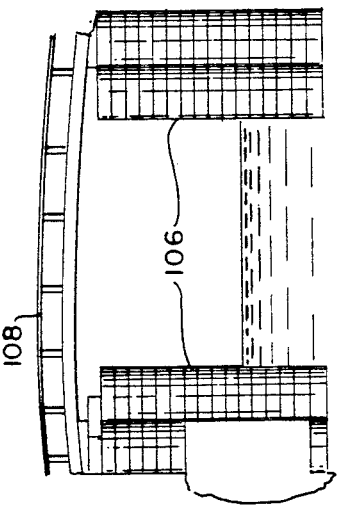
Figure 6D:
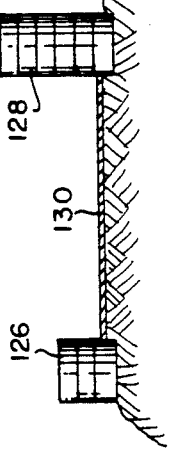
Figure 6E:
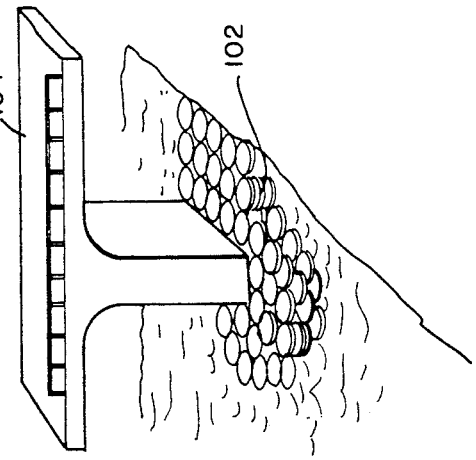
Figure 6F:
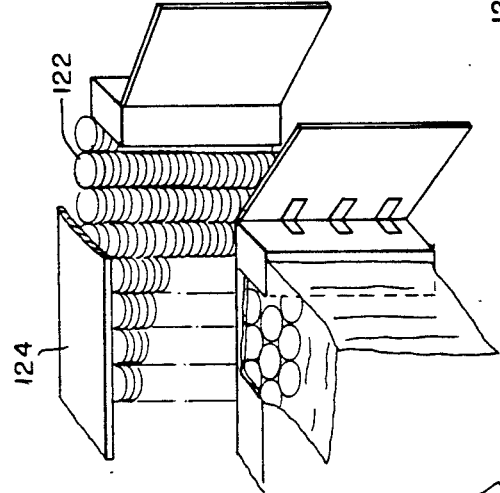
Figure 6G:
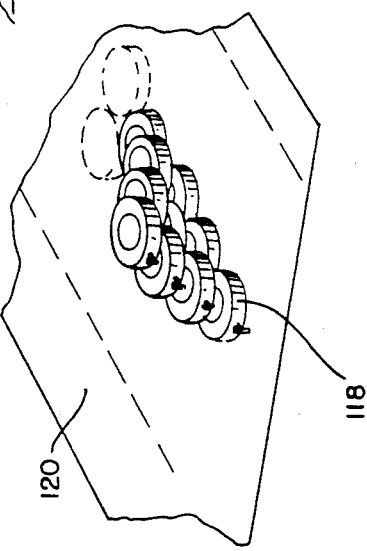

In FIGS. 6a–6g, there are shown a number of preferred applications for the construction block of the present invention. As shown in FIG. 6a, a plurality of blocks can be used as a foundation 102 for a bridge pier 104. As shown in FIG. 6b, a plurality of blocks can be used as side piers 106 for a bridge 108. In FIG. 6c, a subsurface 110 formed from a plurality of blocks for a highway or airfield 112 is shown. In FIG. 6d, a plurality of blocks are used as a bulkhead 114 to support a bank 116. In FIG. 6e, a plurality of blocks are used as a protective divider 118 for a highway 120. In FIG. 6f, a plurality of blocks are used to form the sidewalls 122 of a lock 124. In FIG. 6g, a plurality of blocks are used as a highway guard rail 126 and a rockslide guard 128 for a highway 130.

Figure 7:
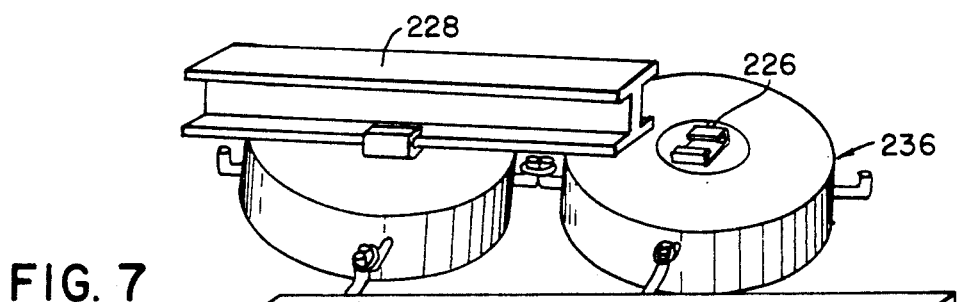
FIG. 7 is a perspective view of an alternative embodiment of FIG. 1 wherein the block is adapted to retain a railroad rail.
Figure 8:
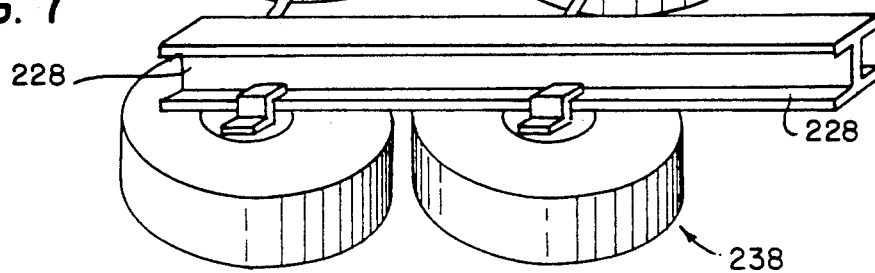
FIG. 8 is a perspective view of the rail connectors of FIG. 7.

Referring now to FIGS. 7 and 8, there is shown an alternative embodiment of the construction block to that of FIG. 1, wherein a vertical connector 226 is provided having a receptacle 230 which is adapted to receive and retain a railroad rail 228 therein. The vertical connector 226 preferably is connected with the horizontal support member 232, which is similar to that of FIG. 1. An adjustment bolt 234 is provided for adjusting the size of the receptacle 230. A plurality of blocks having the vertical connector 226 can be arranged and connected, as hereinbefore described, to define two parallel rows 236 and 238 for supporting and retaining a railroad track thereon.

Figure 9:
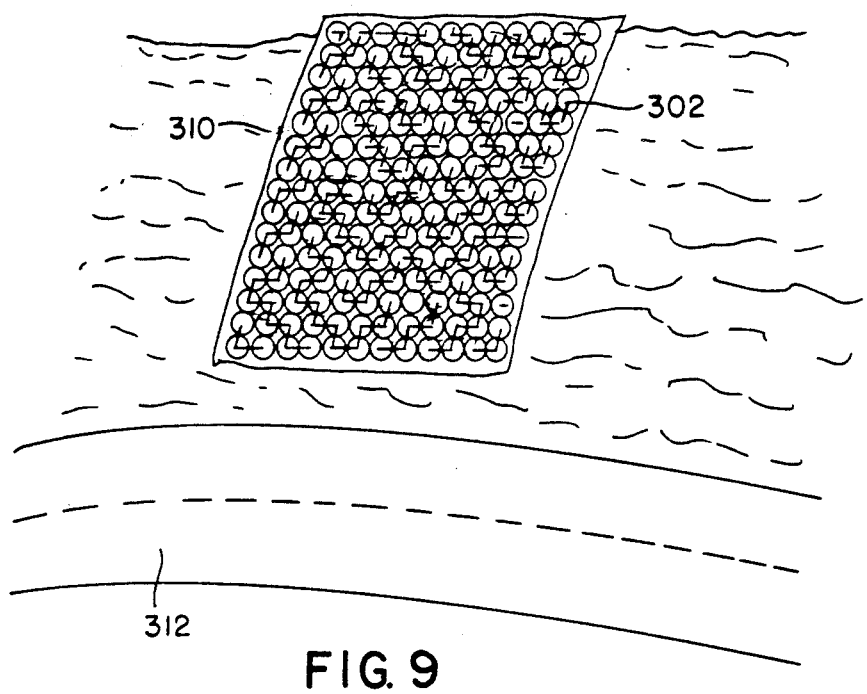
FIG. 9 is a perspective view of the rock-slide catcher of the present invention employed on a hill above a highway.
Figure 10:
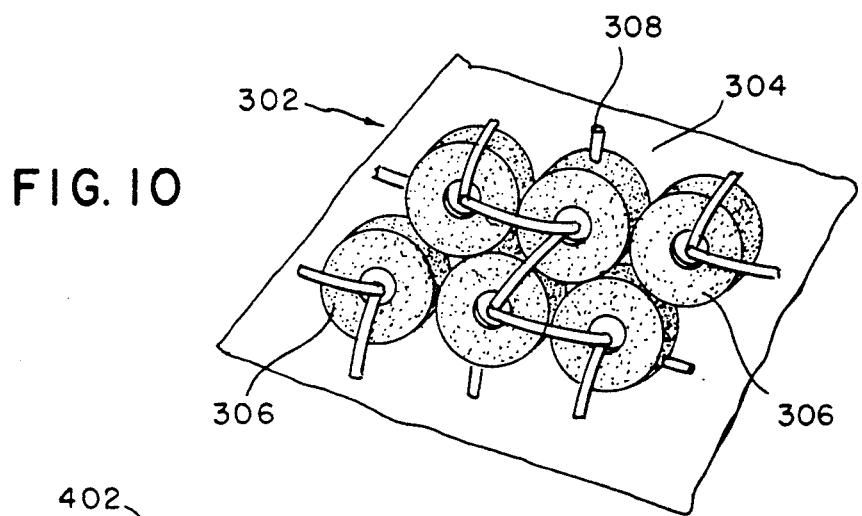
FIG. 10 is an enlarged partial top plan view of the rock-slide catcher of FIG. 9.

Referring now to FIGS. 9 and 10, a rock-slide catcher 302 is provided which includes a sheet of synthetic plastic material 304, a layer of tires arranged in tread-to-tread relation, and a flexible line 308 woven through the layer of tires 306 and the sheet 304 for interconnection therewith. As shown in FIG. 9, the rock-slide catcher 302 can be positioned on a hill 310 to stop rocks and other dangerous debris from falling on a highway 312.

Figure 11:
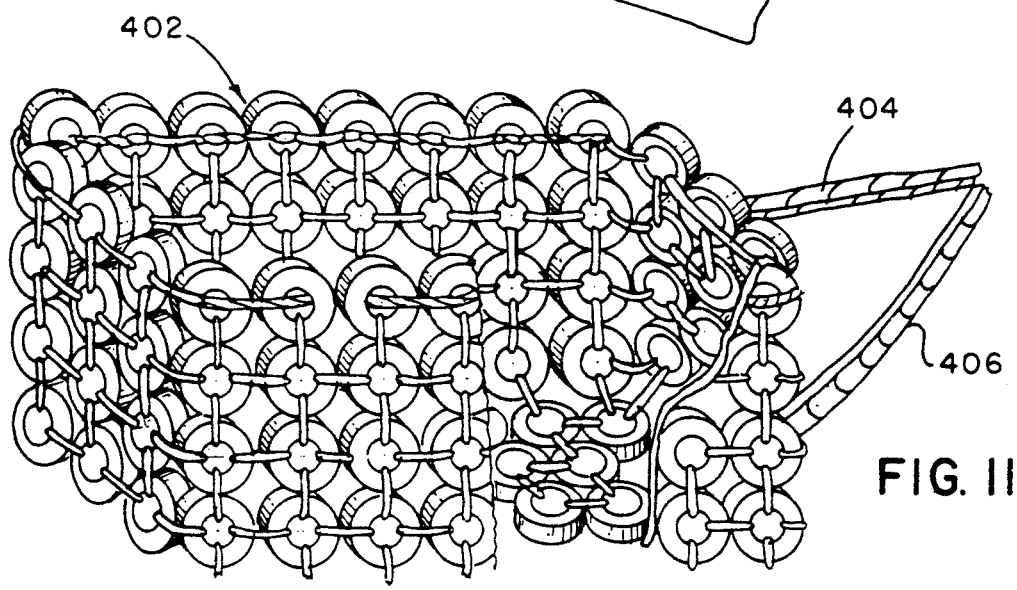
FIG. 11 is a perspective view of a tire containment net partially broken away.

In accordance with the invention, a method is disclosed for economically transporting a large number of tires to a remote location. A plurality of tires are interconnected with a flexible line to define a tire containment net 402 as shown in FIG. 11. The net is either constructed in a dry dock or positioned in a dry dock after it is constructed. Two tow lines 404 and 406 are connected with the upper and the lower portions of the net 402, respectively. Preferably the tow lines 404 and 406 are woven in and out of the tires which form the net 402. The tires to be transported are stacked in rows and bound together with a line. A crane is then used to load the rows of tires into the net. Preferably, the rows of tires are then connected to the sidewalls of the net. When the net is fully loaded, the dry dock is then flooded causing the net and contained tires to float relative to the bottom of the dry dock. The tow lines are then connected with a tug boat and towed to a remote destination.

Some of the tires used to form the net 402 may be filled with a buoyant material, such as styrofoam, to insure that the net will not sink. In addition, air may be pumped through the net so that at least some of the air will become trapped in the net, thereby providing increased buoyancy. Air can be pumped through the net by positioning a network of air hoses under the net and pumping air from an air compressor on the boat therethrough.

Figure 12:
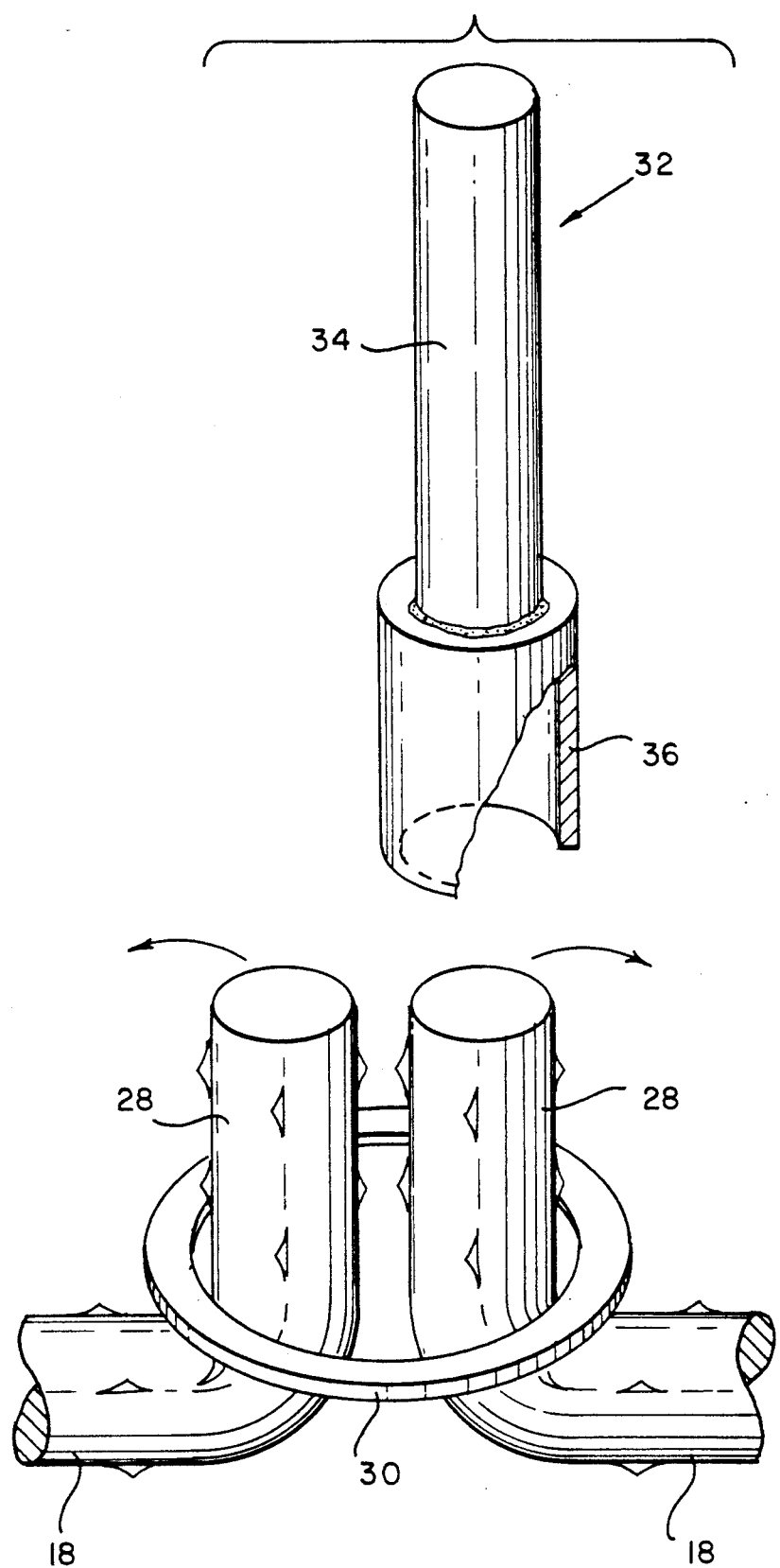
FIG. 12 is a partial sectional view of a tool for bending the first connectors.

In FIG. 12 there is shown a tool 32 for bending the portions 28 of the first connectors 18 about the connecting ring 30. The tool comprises an elongated cylindrical rod having a solid handle portion 34 at its upper end and a hollow pipe portion 36 at its lower end coaxial with the handle portion. The rod is formed from hardened steel, with the handle and pipe portions being formed as a unitary member. The inner diameter of the handle portion is slightly greater than the outer diameter of the connector (which preferably comprises rebar). When the connector is arranged coaxial with the rod and one end of the connector is inserted into the pipe portion, the handle portion may be displaced from the axis of the bar to bend the bar end at an angle from the bar axis.

While in accordance with the patent statute, the preferred forms and embodiments of the invention have been illustrated and described, it will be apparent to those of ordinary skill in the art that various changes and modifications may be made without deviating from the inventive concepts set forth above.

What is claimed is:

1. A construction block, comprising:
   (a) a tire having a treat portion and two opposed sidewalls defining an interior chamber, said sidewalls defining an interior chamber, said sidewalls each having a central opening therein;
   (b) a quantity of hardened material substantially filling said interior chamber;
   (c) at least one first connector member retained within said material and having an end extending through said tread portion of said tire;
   (d) a second connector member retained within said material perpendicular to said first connector member and having an end extending from said central opening in one of said sidewalls, whereby a plurality of said blocks can be connected together to define a structure;
   (e) wherein said second connector member comprises a receptacle for receiving and retaining a railroad rail.

2. A construction block as defined in claim 1, wherein said quantity of hardened material comprises concrete.

3. A construction block as defined in claim 1, and further comprising a plurality of spaced first connectors extending radially from said tread portion.

4. A construction block as defined in claim 3, wherein said plurality of spaced first connectors comprise opposed pairs of said first connectors, each opposed pair comprising a unitary elongated bar.

5. A construction block as defined in claim 4, wherein said first connector ends each include a bent portion for connection with an adjacent block.

6. A structural assembly, comprising:
   (a) a plurality of construction blocks, each of which includes:
      (1) a tire having a tread portion and two opposed sidewalls defining an interior chamber, said sidewalls each having a central opening therein;
      (2) a quantity of hardened material substantially filling said interior chamber;
      (3) at least one first connector member retained within said material having an end extending through said tread portion of said tire;
      (4) a second connector member retained within said material perpendicular to said first connector member and having an end extending from said central opening in one of said sidewalls, wherein said second connector member comprises a receptacle for receiving and retaining a railroad rail; and
   (b) means for connecting adjacent first connectors to define a horizontal structure having a single layer of said blocks.

7. A structural assembly as defined in claim 6, wherein said connector ends include bent portions, said connector means connecting said bent portions of adjacent blocks.

8. A structural assembly as defined in claim 7, wherein said connector means comprise rings which receive said bent portions.

9. A structural assembly as defined in claim 6, and further comprising a plurality of said layers arranged in vertical stacked relation, and means for connecting said second connectors of said blocks between adjacent layers.

10. A structural assembly as defined in claim 9, wherein said blocks in adjacent layers are offset from one another, whereby each block in a stacked layer is supported in contiguous relation by a plurality of blocks in a layer below.

* * * * *